UNITED STATES PATENT OFFICE.

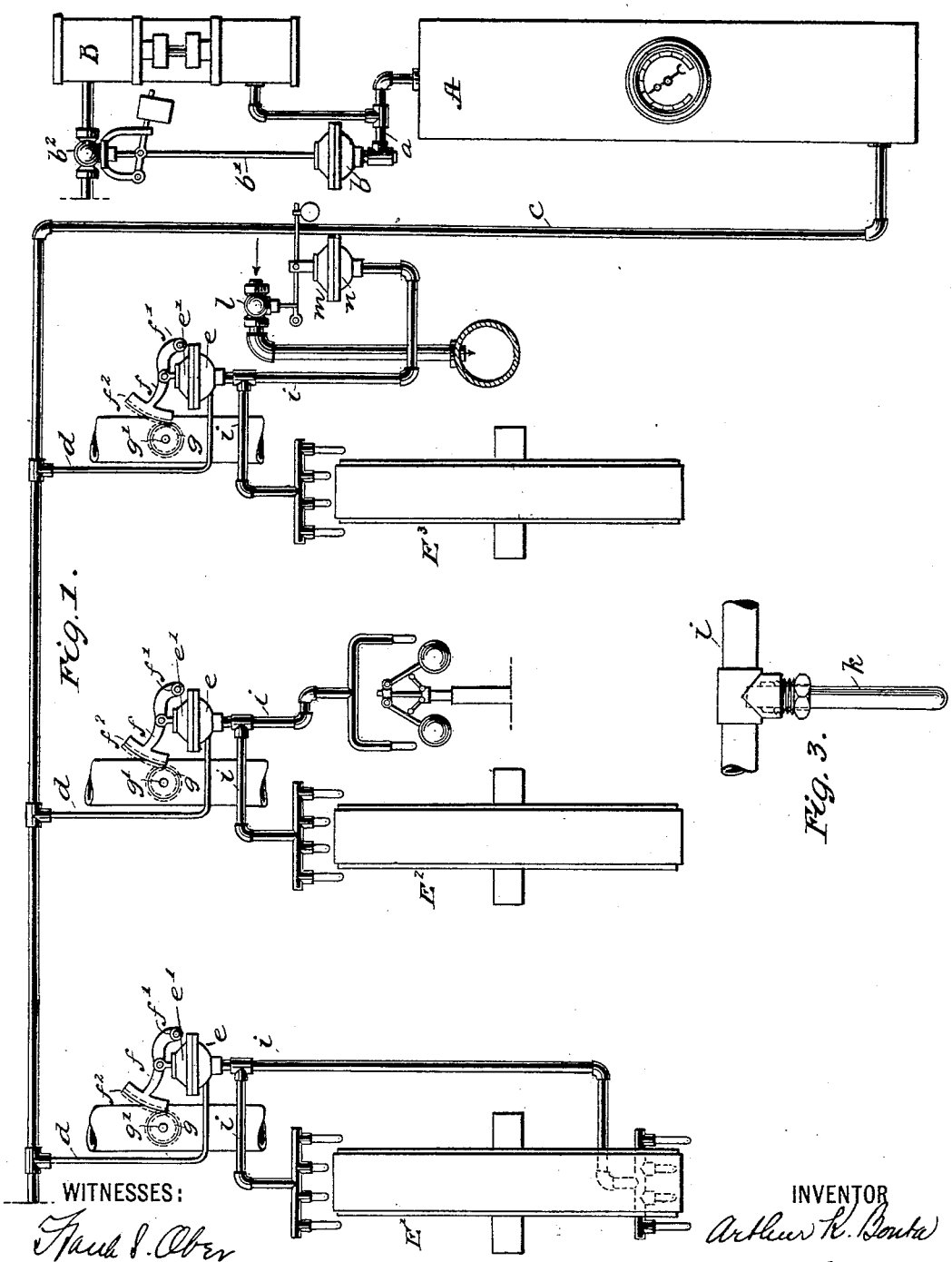

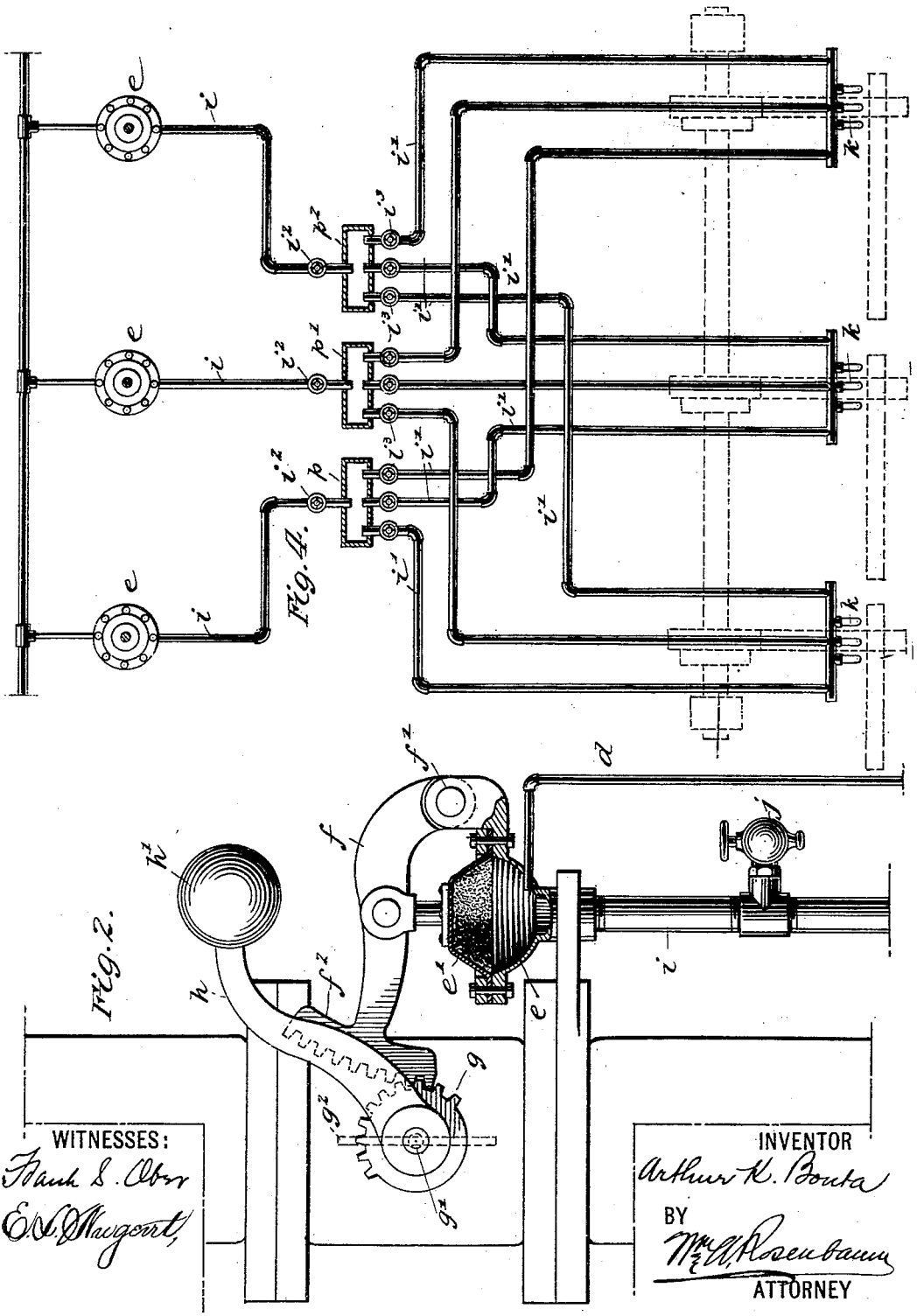

ARTHUR K. BONTA, OF HOBOKEN, NEW JERSEY, ASSIGNOR TO THE BONTA MANUFACTURING COMPANY, OF NEW JERSEY.

AUTOMATIC ENGINE-STOP.

SPECIFICATION forming part of Letters Patent No. 569,445, dated October 13, 1896.

Application filed January 27, 1896. Serial No. 576,930. (No model.)

*To all whom it may concern:*

Be it known that I, ARTHUR K. BONTA, a citizen of the United States, residing at Hoboken, in the county of Hudson and State of New Jersey, have invented certain new and useful Improvements in Automatic Engine-Stops, of which the following is a full, clear, and exact description.

This invention is an automatic engine-stop utilizing in its operation compressed air.

The object of the invention is to equip a power plant with apparatus which will automatically immediately stop the driving motor or motors whenever any of the elements of the apparatus become deranged or act in an abnormal manner to such an extent as to endanger the plant or the lives of those operating it.

The principle of the automatic fluid-pressure train-brake is utilized to a certain extent in carrying out this invention, in that a leakage or break in the system of piping through which the air-pressure is transmitted would result in stopping the motor or engine.

My invention comprehends the combination of one or more engines or motors, an automatic air-compressor, an air-reservoir, a system of piping leading from the reservoir to air-motors connected with the cut-off valves of the engines or motors, and also leading to air-motors which may be necessary for operating other controlling devices, and one or more devices adapted to be automatically operated when any serious derangement or abnormal operation of the power plant takes place to render active the said air-motors, and thus enable them to control the engines or motors.

The details of construction in which the invention is embodied also form a portion of my invention.

Referring to the accompanying drawings, Figure 1 is a diagrammatical plan of the apparatus constituting my invention. Fig. 2 is a detail of a motor and valve operated thereby. Fig. 3 is a detail of an air-releasing device. Fig. 4 is a diagram illustrating how the various lines of air apparatus may be thrown into and out of operation.

The system comprises an air-storage tank A, in which the pressure is maintained uniform by a steam-pump B, automatically controlled in any manner.

I have shown a pipe $a$ leading to a casing $b$, containing a piston attached to rod $b'$, which in turn operates the valve $b^2$, supplying steam to the pump. A fall of pressure in the tank allows the piston to drop and open the valve to start the pump. When the pressure reaches the normal point, the piston raises and closes the valve.

From the tank a trunk-line of piping $c$ leads through the power-house in any manner found most expedient. Its distant end will usually be "blind." From this trunk-line branches $d\ d$, &c., lead off to the various cut-off valves or switches which supply steam or other fluid to the engines or motors of the plant.

Fig. 1 indicates three engines, the fly-wheels $E'\ E^2\ E^3$ only being shown, and in Fig. 2 one of the valves by which steam is cut off from the engines is shown. Adjacent to each valve is suitably supported a casing $e$ in the form of a bowl, being closed across the top by a rubber or other flexible diaphragm $e'$. A branch pipe $d$ supplies air-pressure to the bowl. The diaphragm is attached to an arm $f$, pivoted at $f'$ and provided on its free end with a segment of gear $f^2$, engaging with a wheel $g$, fixed to the projecting end of the shaft $g'$ of a "butterfly-valve" $g^2$, located in the steam-supply pipe of the engine. Upon this shaft is also fixed an arm $h$, carrying a weight $h'$, normally elevated to a position where it may lower when released to rotate the valve-shaft and close the valve.

From the bowl $e$ one or more exhaust-pipes $i$ lead. These pipes are comparatively much larger than the supply branch pipes $d$. They are to be provided with various forms of air-releasing devices, which will now be referred to. One form will be an ordinary cock to be operated by hand, as shown at $j$, to be inserted either at the blind end or in the line of the pipe wherever it may be conveniently reached and at as many points as desired. Another form is shown in Fig. 3, and consists of a tube or bulb $k$ of fragile material communicating freely with the pipe to which it is attached, but normally sealing the pipe. These tubes or bulbs are preferably of glass and are adapted to be broken by a blow delivered by hand or by a part of the moving machinery when disarranged, and thereby permitting the escape of air from the pipe $i$, to which they are connected.

In Fig. 1 I have shown a number of these tubes placed adjacent to the fly-wheels of the engines in such positions that if the belt starts to run off the wheel it will come in contact with one of them; or if a lap in a joint of the belt should lift it would strike a tube. The tubes might also be similarly located with respect to the belts driven from the counter-shafting. A tube might be placed adjacent to the balls of a centrifugal device similar to the ordinary governor, so that when the speed becomes too great the balls will strike and destroy the tube.

The operation of the devices will be readily understood.

Whenever any of the air-releasing devices $k$ are destroyed or a cock $j$ is opened, the air escapes from the bowl $e$ much faster than it can enter it from the tank A, and so the diaphragm yields to the weight $h'$, permitting the latter to swing downward and close the main steam-supply pipe of the engine.

In engines with which a jet-condenser is used it is necessary to admit air into the exhaust-pipe or into the condenser when the supply of steam is thus cut off from the engine, in order to prevent the engine, which continues to run by its inertia, from pumping the water from the condenser into the engine-cylinder, and to do this my invention comprehends a valve $l$, controlling communication between the atmosphere and the exhaust-pipe of the engine, and an air-motor $m$ of substantially the same description as those used in connection with the steam-cut-off valves. The bowl $n$ of the motor connects with one of the pipes $i$, so that when an exhaust takes place from any of said pipes the vacuum of the condenser will be "broken" at about the same time that the steam is cut off.

It will be understood that the release of air at any point only affects the engine which is driving the part or element responsible for the release and therefore any number of engines may be controlled from one storage-tank and trunk-pipe.

In large power plants where more than one engine is used it is customary to provide a main shaft, to which any number of the engines may be clutched, and one or more counter-shafts, any number of which may be geared to the load. Consequently it becomes desirable to provide means for making only those portions of the air system operative as apply to the engine or engines that are running at any given time. I have provided such means in the form of a "switchboard" or central station, where are located various cut-off valves to be manipulated by an operator to accomplish the result referred to. This is illustrated in Fig. 4. The exhaust-pipes $i$ from the air-motors $e$ of each engine lead, respectively, to three small tanks $p$, $p'$, and $p^2$, and from each of these tanks a number of pipes $i'$ lead to the several groups of moving elements, transmitting motion to the respective parts into which the load upon the plant is divided. Pipes $i$ are equipped with cut-off valves $i^2$, and pipes $i'$ with valves $i^3$. If only one engine is running, all of the valves $i^2$ are closed except the one corresponding to the engine in use, and if more than one engine is running the valves $i^2$ corresponding to the active engines only are open. If one engine is driving the entire load, the three pipes $i'$ leading from the tank $p$, $p'$, or $p^2$ will all be open. If it is driving only one or more sections of the load, then the corresponding pipes $i'$ will be open while the others are closed, and so various changes can be made at the switchboard to make the working portion of the apparatus correspond at all times with the working portion of the power plant.

Having thus described my invention, I claim—

1. An automatic engine-stop consisting of an air-motor adapted to operate a cut-off valve of the engine in combination with a source of air supply acting through the motor to hold the valve open and a pipe or pipes leading from the motor to a point or points adjacent to the moving parts driven by the engine, and air-releasing devices located at such points and adapted to be operated by such part when deranged, substantially as described.

2. In an automatic engine-stop, the combination of an air-storage tank, means for maintaining a constant pressure therein, a trunk-line of pipe extending from the tank, a plurality of engines, a plurality of air-motors, one for controlling the cut-off valve of each engine, branch pipes leading from said trunk-pipe to each air-motor and supplying air-pressure thereto to hold the cut-off valves open, normally-closed exhaust-pipes leading from the air-motors to points adjacent to the moving parts of the engine or machine driven thereby and air-releasing devices in said exhaust-pipes adapted to be operated by the moving parts of the engine or machinery driven thereby, substantially as described.

3. A pneumatic system for stopping the motors or engine of a power plant, the same consisting of a number of air-motors respectively actuating the controlling-valves of the motor or engines, exhaust-pipes leading from said air-motors to a switchboard and from the switchboard to various air-releasing devices and valves in the pipes at the switchboard whereby any portion of the system may be made operative at will, substantially as described.

In testimony whereof I subscribe my signature in presence of two witnesses.

ARTHUR K. BONTA.

Witnesses:
FRANK S. OBER,
WM. A. ROSENBAUM.